(12) United States Patent
Van de Wege et al.

(10) Patent No.: US 11,490,569 B2
(45) Date of Patent: Nov. 8, 2022

(54) PULLEY ASSEMBLY FOR AN AGRICULTURAL HARVESTER

(71) Applicant: CNH Industrial America LLC, New Holland, PA (US)

(72) Inventors: Charlotte Van de Wege, Zulte (BE); Ruben Vancoillie, Rumbeke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/598,865

(22) PCT Filed: Mar. 24, 2020

(86) PCT No.: PCT/EP2020/058107
§ 371 (c)(1),
(2) Date: Sep. 27, 2021

(87) PCT Pub. No.: WO2020/193521
PCT Pub. Date: Oct. 1, 2020

(65) Prior Publication Data
US 2022/0087107 A1    Mar. 24, 2022

(30) Foreign Application Priority Data
Mar. 26, 2019   (EP) .................................. 19165353.4

(51) Int. Cl.
*A01D 69/06*   (2006.01)
*A01D 87/00*   (2006.01)
(Continued)

(52) U.S. Cl.
CPC ............. *A01D 69/06* (2013.01); *A01D 87/00* (2013.01); *F16D 9/04* (2013.01); *F16D 11/14* (2013.01);
(Continued)

(58) Field of Classification Search
CPC . F16D 9/04; F16D 11/14; F16H 21/04; F16H 2007/0806; F16H 2700/02;
(Continued)

(56) References Cited

U.S. PATENT DOCUMENTS 2,559,299 A   7/1951   Helling
2,810,303 A   10/1957  McGay
(Continued)

FOREIGN PATENT DOCUMENTS

DE   102015103921 A1 *  9/2016  ............. F16H 7/023
EP   0242463 A1   10/1987
(Continued)

OTHER PUBLICATIONS

International Search Report and Written Opinion for PCT Application No. PCT/EP2020/058107 dated Jun. 22, 2020 (10 pages).
(Continued)

*Primary Examiner* — Arpad Fabian-Kovacs
(74) *Attorney, Agent, or Firm* — Peter Zacharias; Patrick Sheldrake

(57) ABSTRACT

A pulley assembly is provided for mounting on a rotatable shaft of an agricultural harvester and is operable in a high-speed configuration or a low-speed configuration. The pulley assembly comprises a high-speed pulley with a high-speed running surface for receiving a drive belt when the pulley assembly is in the high-speed configuration and a low-speed pulley with a low-speed running surface for receiving a drive belt when the pulley assembly is in the low-speed configuration. The pulley assembly has three sets of teeth extending from surfaces of the two pulleys. In the low-speed configuration, the running surfaces of the low-speed pulley and high-speed pulley are axially aligned and the first set of teeth and the second set of teeth are engaged.

(Continued)

In the high-speed configuration, the running surface of the high-speed pulley is exposed for receiving the drive belt.

17 Claims, 10 Drawing Sheets

(51) Int. Cl.
| | | |
|---|---|---|
| *F16D 9/04* | (2006.01) | |
| *F16D 11/14* | (2006.01) | |
| *F16H 21/04* | (2006.01) | |
| *A01D 69/08* | (2006.01) | |
| *F16H 7/08* | (2006.01) | |
| *A01F 12/56* | (2006.01) | |

(52) U.S. Cl.
CPC .............. *A01D 69/08* (2013.01); *A01F 12/56* (2013.01); *F16H 21/04* (2013.01); *F16H 2007/0806* (2013.01); *F16H 2700/02* (2013.01)

(58) Field of Classification Search
CPC ........ A01D 69/06; A01D 87/00; A01D 69/08; A01F 12/56
See application file for complete search history.

(56) References Cited

U.S. PATENT DOCUMENTS

| | | | | |
|---|---|---|---|---|
| 3,146,633 | A * | 9/1964 | Wellauer | ............... F16H 61/662 |
| | | | | 477/15 |
| 3,175,425 | A | 3/1965 | Horne et al. | |
| 3,375,738 | A * | 4/1968 | Mahlon | ............... F16H 61/0293 |
| | | | | 475/210 |
| 3,430,505 | A * | 3/1969 | Klaus | ..................... A01D 41/12 |
| | | | | 474/46 |
| 4,133,225 | A * | 1/1979 | Love | ..................... A01D 41/142 |
| | | | | 475/19 |
| 4,454,787 | A | 6/1984 | Love et al. | |
| 4,455,812 | A * | 6/1984 | James | ..................... A01D 69/08 |
| | | | | 192/48.2 |
| 4,483,128 | A * | 11/1984 | Hawkins | ................ A01D 69/06 |
| | | | | 475/263 |
| 6,773,367 | B2 * | 8/2004 | Lautenberg | ............ A01D 69/08 |
| | | | | 474/58 |
| 10,244,683 | B2 * | 4/2019 | Gopalakrishnan | ...... A01F 12/56 |
| 10,295,026 | B2 * | 5/2019 | Williams | ............... A01D 69/06 |
| 2004/0009834 | A1 | 1/2004 | Laufenberg et al. | |
| 2004/0043847 | A1 * | 3/2004 | Jonckheere | ............ A01F 12/56 |
| | | | | 474/8 |
| 2013/0210506 | A1 | 8/2013 | Hollatz | |
| 2014/0148286 | A1 | 5/2014 | Murray et al. | |
| 2017/0059014 | A1 | 3/2017 | Bailliu et al. | |
| 2017/0105355 | A1 | 4/2017 | Rosseel et al. | |

FOREIGN PATENT DOCUMENTS

| | | | | |
|---|---|---|---|---|
| FR | 2371134 A * | 6/1978 | ............ A01F 12/40 |
| GB | 915101 A | 1/1963 | |
| GB | 1074915 A | 7/1967 | |
| GB | 1480566 A | 7/1977 | |
| WO | WO-2011144993 A1 * | 11/2011 | ............ A01D 69/08 |
| WO | 2016156957 A1 | 10/2016 | |

OTHER PUBLICATIONS

Extended European Search Report for European Application No. 19165353.4 dated Sep. 26, 2019 (4 pages).

* cited by examiner

PULLEY ASSEMBLY FOR AN AGRICULTURAL HARVESTER

TECHNICAL FIELD

The present disclosure relates to a pulley assembly for an agricultural harvester.

BACKGROUND

Agricultural harvesters, such as e.g. combine harvesters, are versatile machines used for harvesting crops. Users often own one harvester that is used to harvest a variety of different crops. Crop requirements and user expectations for operating the harvester vary depending on the type of crop, weather conditions, and other variables, so many agricultural harvesters are highly configurable to enable adaptation for different crops and user requirements.

A particular example of how a harvester may be configured for different crops is the speed of rotation of a feed roller for a combine harvester. A combine harvester comprises a feeding section and a threshing section. The feed roller conveys harvested crop from the feeding section towards the threshing section. For small grain crops, high throughput is desirable to provide crop acceleration, so the feed roller should be operated at a relatively high speed. For corn and beans, the feed roller should be operated at a relatively low speed to avoid grain damage.

To achieve speed variability, a conventional solution is to provide a pulley having a high-speed and a low-speed running surface to transfer power to the feed roller, the high-speed running surface having a smaller diameter than the low-speed running surface. To change speeds, the user must remove the pulley from its shaft, flip it over to correctly position the correct running surface, and reattach the pulley to the shaft. This requires a lot of effort, especially given that the pulley is typically large and heavy.

Additionally, the pulley is typically located behind a large, non-steering front wheel of the harvester. The clearance between the wheel and the pulley is often too small to permit removal of just the pulley, and instead, the cumbersome, inconvenient task of removing the front wheel has to be performed to allow the pulley to be removed and the speed of the feed roller to be changed.

It is an aim of the present invention to address one or more of the disadvantages associated with the prior art.

SUMMARY OF THE INVENTION

According to an aspect of the present invention there is provided a pulley assembly for mounting on a rotatable shaft of an agricultural harvester, the pulley assembly operable in a high-speed configuration or a low-speed configuration. The pulley assembly comprises: a high-speed pulley having a high-speed running surface for receiving a drive belt when the pulley assembly is in the high-speed configuration, a mount for mounting the high-speed pulley to the rotatable shaft for rotation of the high-speed pulley about a central axis, and a storage surface; a low-speed pulley having a low-speed running surface for receiving a drive belt when the pulley assembly is in the low-speed configuration, and a mounting surface for mounting the low-speed pulley to the high-speed pulley; and three sets of teeth, each set of teeth comprising at least one tooth that extends either from the mounting surface radially towards the central axis or from the storage surface radially away from the central axis, and wherein a first set of the three sets of teeth extends from a different surface than a second set of teeth and a third set of teeth of the three sets of teeth. In the low-speed configuration, the running surfaces of the low-speed pulley and high-speed pulley are axially aligned and the first set of teeth and the second set of teeth are engaged. In the high-speed configuration, the running surface of the high-speed pulley is exposed for receiving the drive belt, the low-speed pulley is positioned beside the running surface of the high-speed pulley along the central axis, and the first set of teeth and the third set of teeth are engaged. The pulley assembly is configurable between the high- and low-speed configurations by disengagement of the teeth, movement of the low-speed pulley along the central axis, and engagement of the teeth.

The pulley assembly advantageously reduces the effort and time required to alternate between a high-speed configuration and a low-speed configuration. Whereas conventional techniques require removal of the entire pulley assembly from a shaft to which it is mounted, the pulley assembly described above is configurable between configurations without removal from the shaft. As a result, there is less danger of damaging components of the harvester, and no danger of incorrectly re-fitting components to the harvester. Particularly, the pulley assembly is maintained on the shaft at the same position, and so the low-speed pulley and high-speed pulley are able to be positioned correctly each time, whereas previously the changing of speeds may have resulted in an incorrect positioning of the pulley assembly.

Furthermore, the ability to reconfigure the pulley assembly permits the combination of different sized low-speed and high-speed pulleys much more easily than was conventionally possible. To achieve a new speed with conventional pulleys, a new pulley assembly had to be purchased. The pulley assembly described above permits the sizes of low- and high-speed pulleys to be changed without having to replace the entire pulley assembly.

The first set of teeth may extend from the low-speed pulley, and the second and third sets of teeth may extend from the high-speed pulley. Alternatively, the first set of teeth may extend from the high-speed pulley, and the second and third sets of teeth may extend from the low-speed pulley.

Each set of teeth may comprise more than one tooth. The teeth may be evenly spaced around a circumference of their respective surface.

The distance between adjacent teeth of the teeth in each of the second and/or third sets of teeth may be wider than the width of each tooth in the first set of teeth, thereby permitting the teeth of the first set of teeth to pass between the teeth in the second or third sets of teeth while the pulley assembly is configured between the high- and low-speed configurations. Usefully, the implementation of spacings between adjacent teeth that are wider than the first set of teeth ensures that movement of the high- and low-speed pulleys relative to one another is as straightforward as possible.

Each tooth of the second set of teeth may be aligned with a space between two teeth of the third set of teeth. Aligning the teeth of the second sets with spaces between the teeth of the third set beneficially provides a limit to movement of the first set of teeth relative to the second and third sets of teeth. For example, when the first set of teeth passes through the spaces between the third set of teeth during movement of the low-speed pulley, the second set of teeth are then aligned with the first set of teeth and the movement of the low-speed pulley is limited by interference between the first and second sets of teeth. Limiting the movement of the teeth in this way reduces the possibility of moving the pulley too quickly and removing it altogether.

Configuration of the pulley assembly between the high- and low-speed configurations may be achievable by disengaging the engaged teeth, rotating the low-speed pulley relative to the high-speed pulley and the central axis, moving the low-speed pulley along the central axis relative to the high-speed pulley, and engaging the teeth.

Each tooth may comprise at least one bolt hole for receiving a bolt. The bolt holes may be positioned on the teeth to align with respective bolt holes of the teeth of the second and/or third sets. The bolt holes may be threaded. Each of these measures improves the engagement between teeth.

The teeth of the first set of teeth and of at least one of the second and third sets of teeth may comprise cooperating ridges. The cooperating ridges may be positioned on faces of the teeth, such that when the sets of teeth are engaged, the cooperating ridges of the engaged teeth are engaged too. Cooperating ridges improve the engagement between teeth.

The pulley assembly may comprise a further pulley with a diameter that is greater than the diameter of the high-speed pulley. The further pulley may have: a further running surface for receiving a drive belt, a second mounting surface for mounting the further pulley to the high-speed pulley, and a fourth set of teeth comprising at least one tooth that extends from the second mounting surface radially towards the central axis. The fourth set of teeth may be configured to engage with one of the first three sets of teeth in order to align the running surfaces of the further and high-speed pulleys.

As demonstrated, the arrangement above permits the inclusion of a further, third pulley beyond the low- and high-speed pulleys without the removal of the low-speed pulley. While the further pulley may require removal of the front wheel if the pulley assembly is located behind the front wheel of the harvester, the further pulley beneficially allows a greater variety of speeds to be achieved without having to replace the entire pulley assembly.

The diameter of the further pulley may be smaller than the diameter of the low-speed pulley. The diameter of the further pulley may be greater than the diameter of the low-speed pulley.

According to another aspect of the invention there is provided an agricultural harvester comprising the pulley assembly described above.

The agricultural harvester may be a combine harvester comprising a feeding section, a threshing section, and a feed roller for conveying harvester crop from the feeding section towards the threshing section. The pulley assembly may be mounted to a rotatable shaft of the feed roller.

According to another aspect of the invention there is provided a method of configuring the pulley assembly described above from the high-speed configuration to the low-speed configuration or from the low-speed configuration to the high-speed configuration. The method comprises: disengaging the first set of teeth from one of the second or third sets of teeth; rotating the low-speed pulley relative to the high-speed pulley; moving the low-speed pulley along the central axis relative to the high-speed pulley; and engaging the first set of teeth to the other one of the second or third sets of teeth.

Where the teeth of the pulley assembly are evenly spaced around a circumference of their respective surface so that spaces are formed between adjacent teeth and the distance between adjacent teeth of the teeth in each of the second and/or third sets of teeth is wider than the width of each tooth in the first set of teeth, rotating the low-speed pulley relative to the high-speed pulley may comprise rotating the low-speed pulley to align each tooth of the first set of teeth with a space, and/or moving the low-speed pulley may comprise moving the teeth of the first set of teeth through the spaces.

Rotating the low-speed pulley relative to the high-speed pulley may be performed at least twice.

Rotating the low-speed pulley relative to the high-speed pulley may be performed three times. Moving the low-speed pulley along the central axis relative to the high-speed pulley may be performed twice.

Within the scope of this application it is expressly intended that the various aspects, embodiments, examples and alternatives set out in the preceding paragraphs, in the claims and/or in the following description and drawings, and in particular the individual features thereof, may be taken independently or in any useful combination.

BRIEF DESCRIPTION OF THE DRAWINGS

One or more embodiments of the invention will now be described, by way of example only, with reference to the accompanying drawings, in which.

DETAILED DESCRIPTION

In general terms, the present disclosure relates to a pulley assembly for use on an agricultural harvester, the pulley assembly being configurable in a high-speed and a low-speed configuration. As explained below, the pulley assembly is particularly suited for use with a feed roller of a combine harvester, although such pulley assemblies offer advantages when mounted on any rotatable shaft of an agricultural harvester requiring more than one rotational speed.

Figure 1:
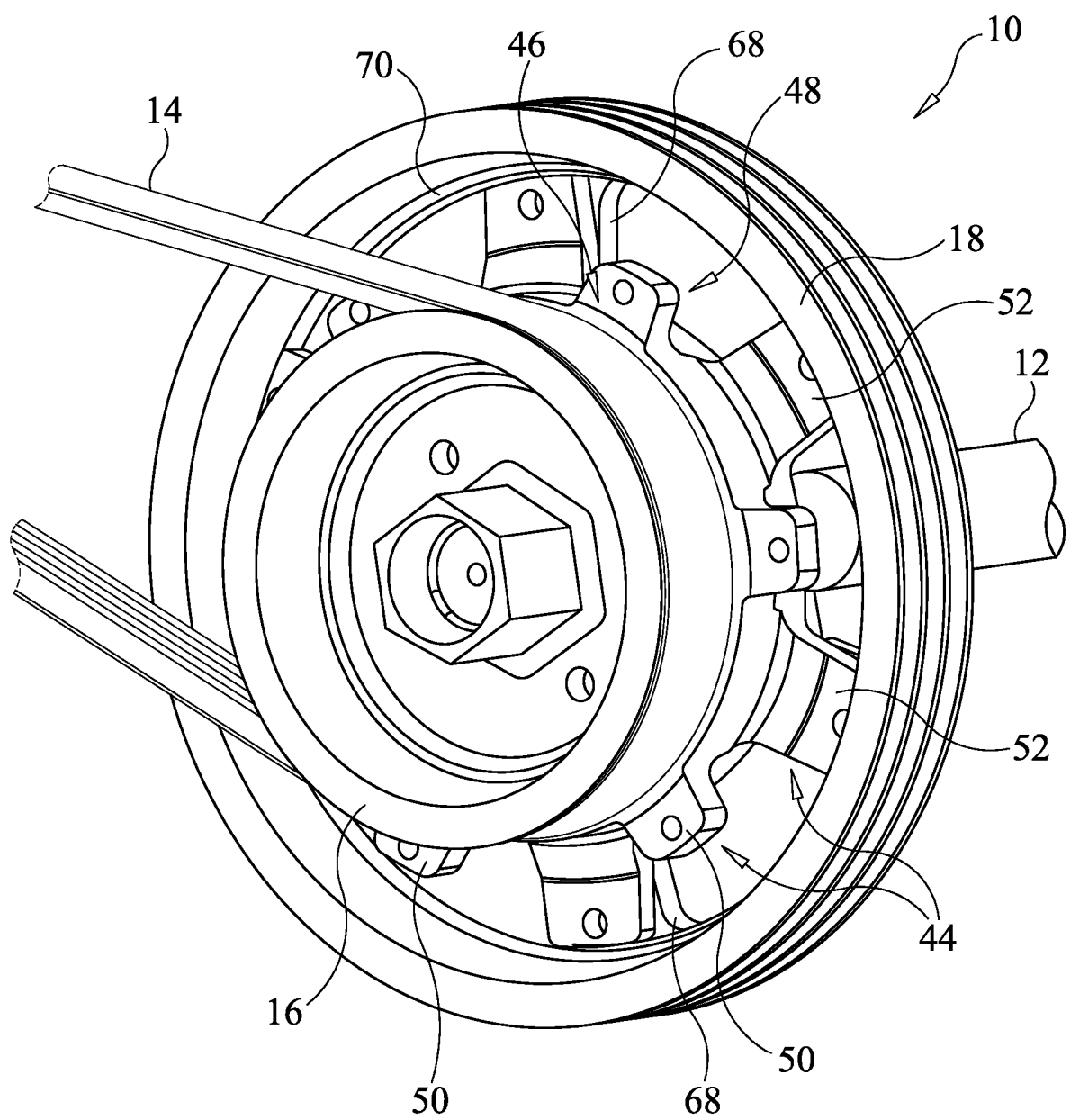
FIG. 1 shows a perspective view of a pulley assembly in a high-speed configuration according to an embodiment of the invention.
Figure 2:
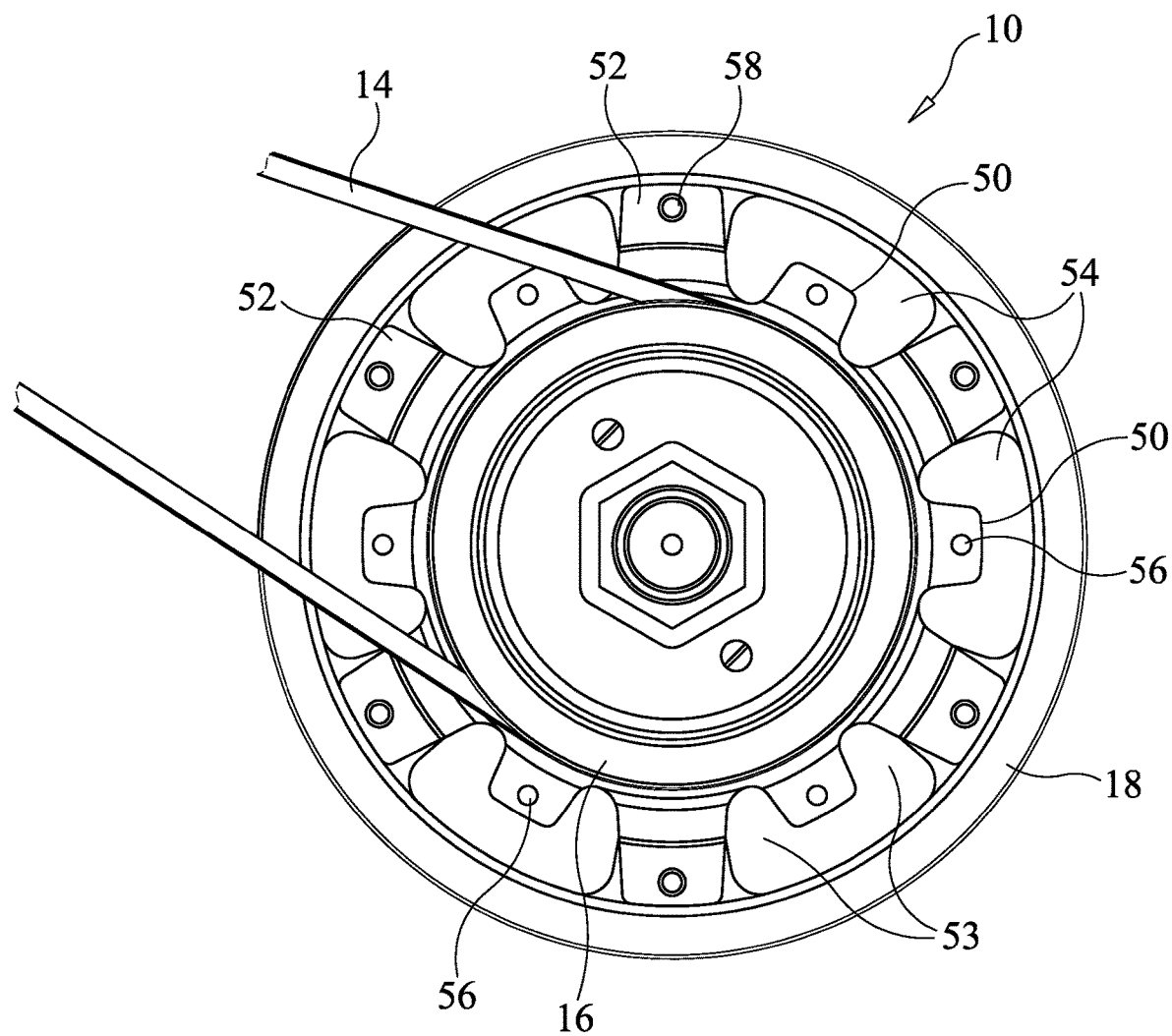
FIG. 2 shows a front view of the pulley assembly of FIG. 1 in the high-speed configuration
Figure 3:
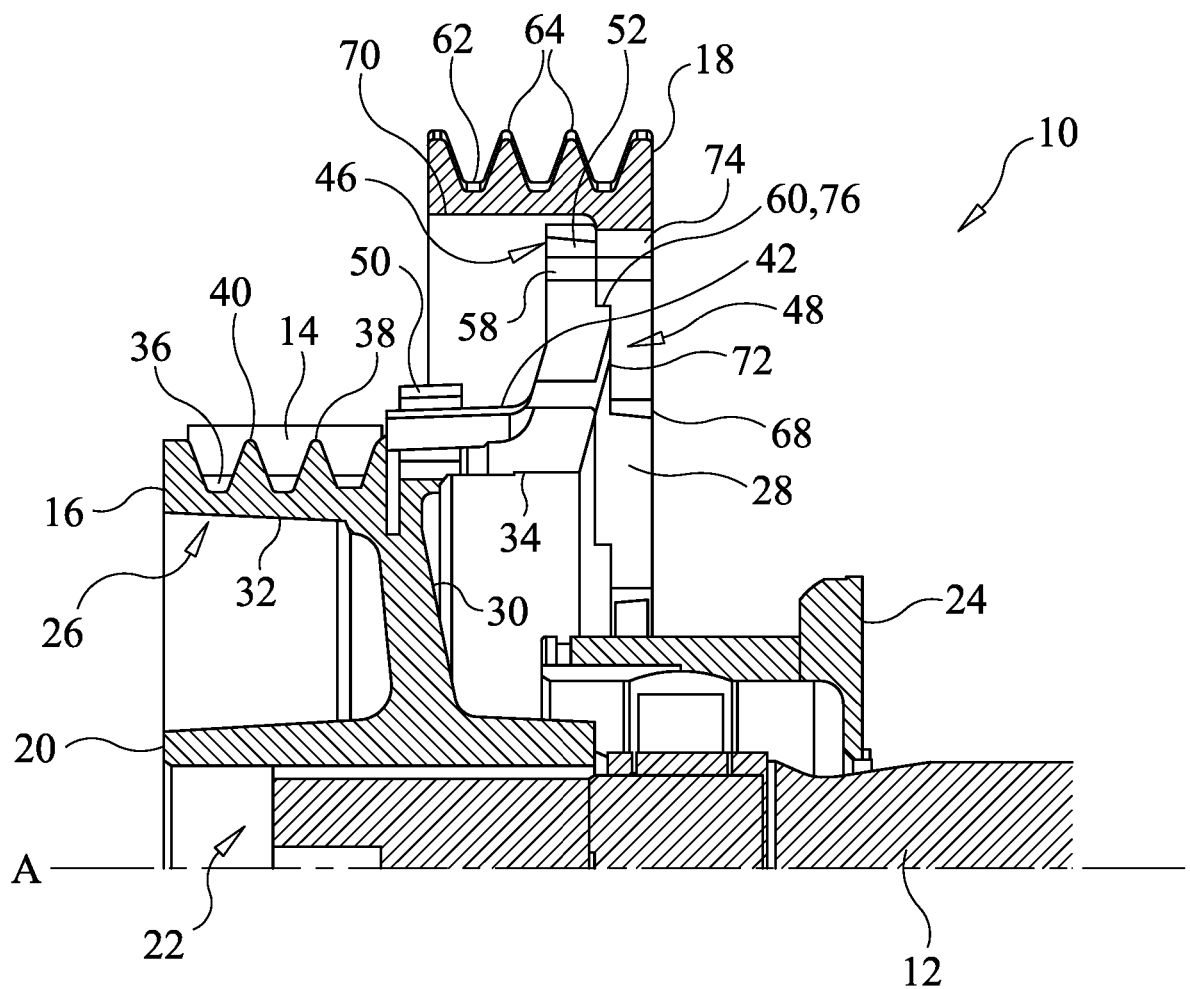
FIG. 3 shows a cross-sectional view of the pulley assembly of FIG. 1 in the high-speed configuration.
Figure 4:
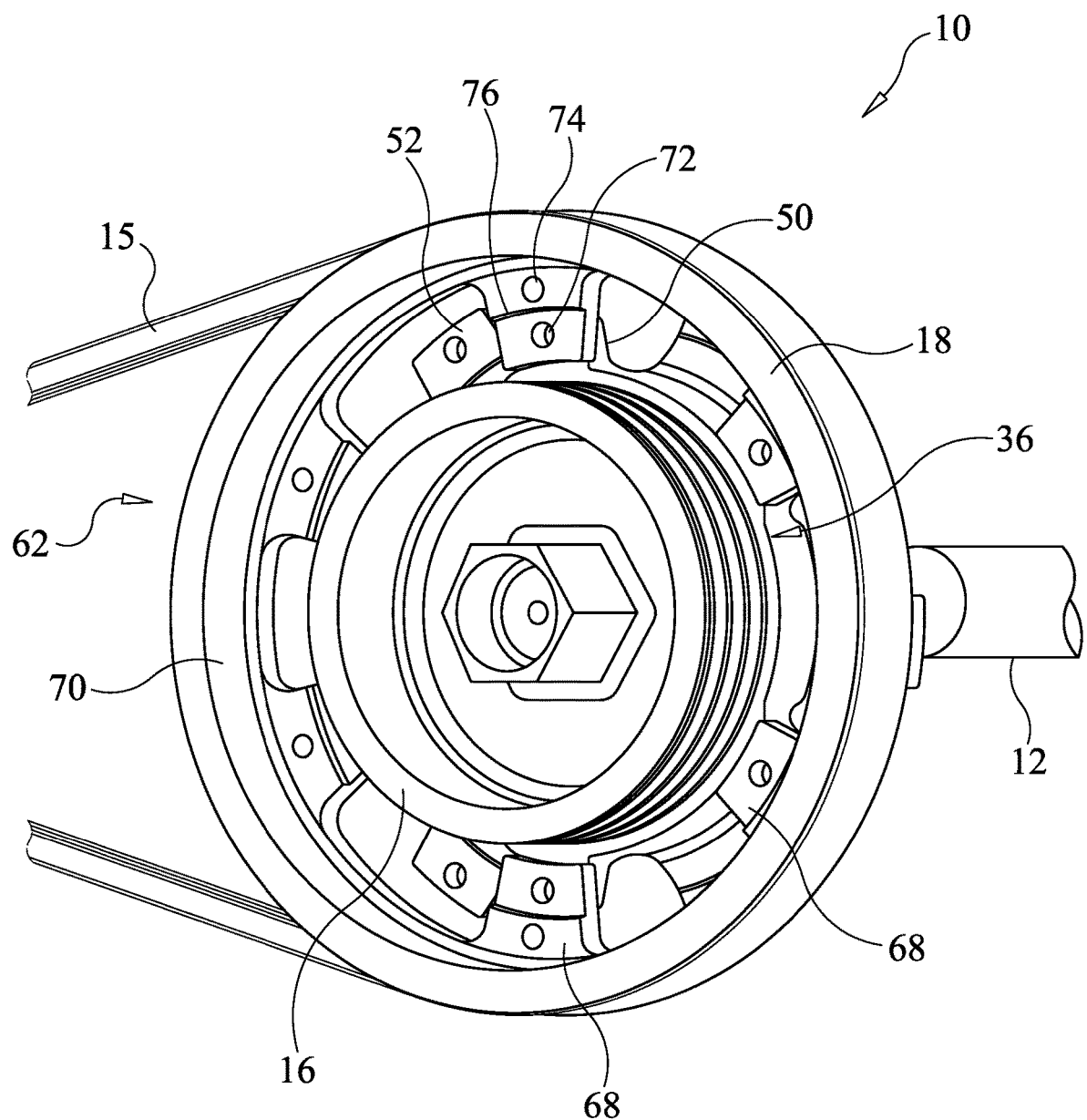
FIG. 4 shows a perspective view of the pulley assembly of FIG. 1 in a low-speed configuration.
Figure 5:
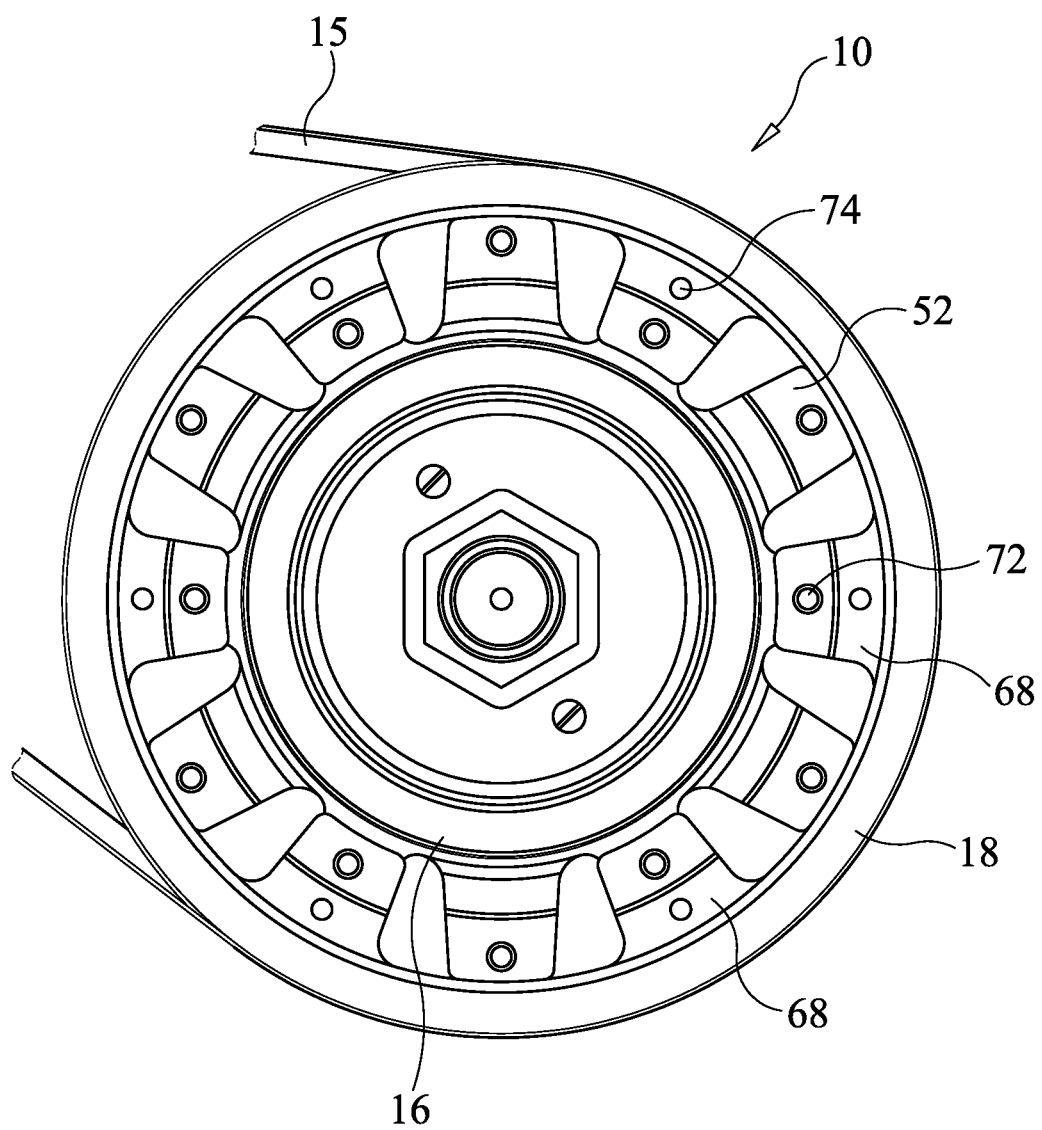
FIG. 5 shows a front view of the pulley assembly of FIG. 1 in the low-speed configuration.
Figure 6:
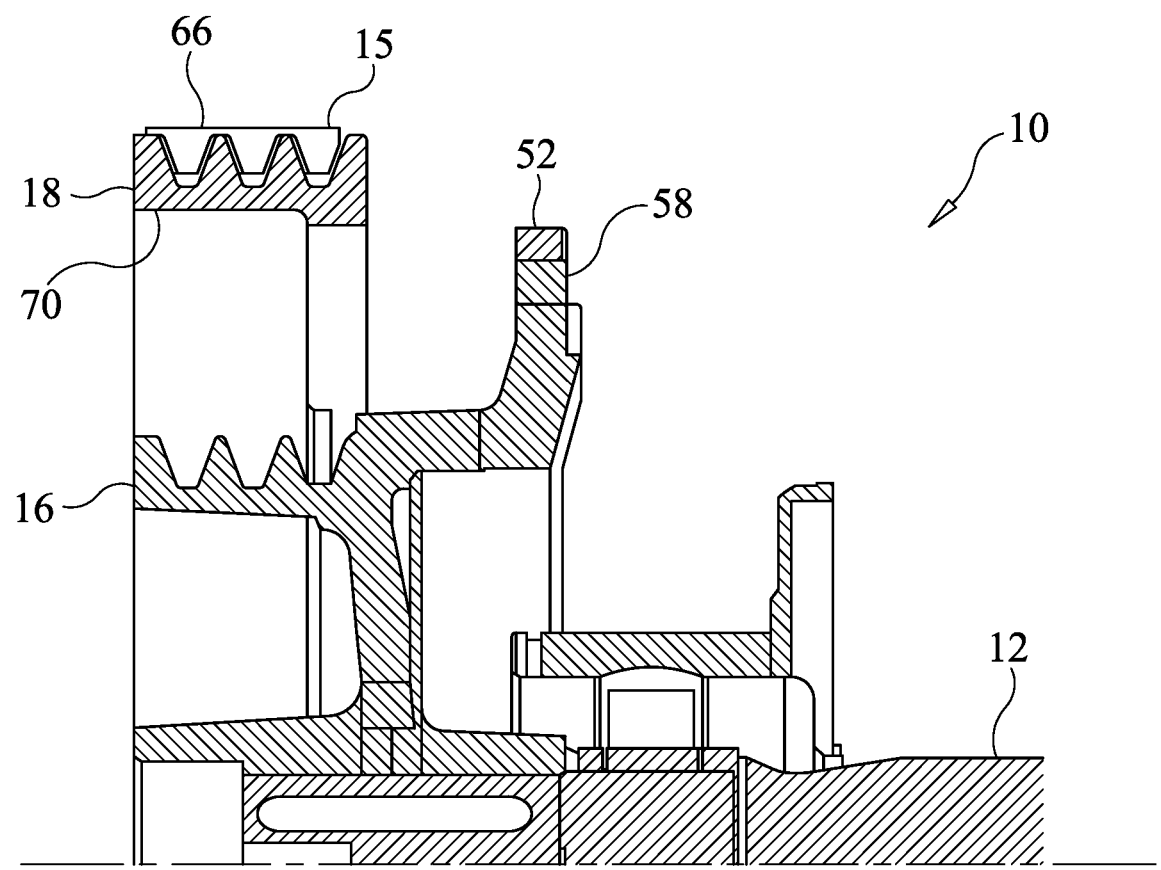
FIG. 6 shows a cross-sectional view of the pulley assembly of FIG. 1 in the low-speed configuration.

A pulley assembly 10 according to an embodiment of the invention is depicted in FIGS. 1 to 6. The pulley assembly 10 is configurable in a high-speed configuration and in a low-speed configuration in order to transmit torque between a drive belt and a shaft. The pulley assembly 10 rotates at a slower speed in the low-speed configuration than when it is in the high-speed configuration. FIGS. 1 to 3 illustrate respective perspective, front, and cross-sectional views of the pulley assembly 10 in the high-speed configuration. FIGS. 4 to 6 illustrate respective perspective, front, and cross-sectional views of the pulley assembly 10 in a low-speed configuration. FIGS. 3 and 6 are halved cross-sectional views of the pulley assembly 10 in the high-speed configuration and the low-speed configuration respectively; the pulley assembly 10 and shaft 12 have rotational symmetry about their central axis A.

In each of FIGS. 1 to 6, the pulley assembly 10 is mounted to a rotatable shaft 12 of an agricultural harvester (not shown). The pulley assembly 10 and the shaft 12 rotate together about a central axis A when a torque is applied to either the assembly 10 or the shaft 12. It is envisaged that the shaft is connected to a feed roller, sometimes referred to as a dynamic feed roll, of a combine harvester, although the pulley assembly 10 may be mounted on a standard feed roll or any other rotatable shaft of an agricultural harvester in order to transmit torque to or from the shaft.

In each of the high- and low-speed configurations, a respective drive belt 14, 15 is engaged with the pulley assembly 10. In use, movement of the drive belt 14, 15 transmits a torque to the pulley assembly 10, which rotates about the central axis A and in turn rotates the shaft 12. The change in speeds between the high- and low-speed configurations of the pulley assembly 10 is achieved by changing the effective circumference of the pulley assembly 10. Therefore, different drive belts 14, 15 are used for the different speed configurations to account for the difference in circumference. Alternatively, a belt tensioner may be used to compensate for the change of the effective circumferences of the pulley assembly 10 in the different configurations, without having to change the belt.

Referring to FIGS. 1 to 6, the pulley assembly 10 comprises a high-speed pulley 16 and a low-speed pulley 18. In each configuration, the pulleys 16, 18 are connected together and rotate together as a single entity when a torque is applied to either one of them. The way in which the pulleys 16, 18 of the pulley assembly 10 engage with and are connected to one another, as well as the relative positioning of the pulleys, defines the configuration of the pulley assembly 10, as will be described in detail later.

The high-speed pulley 16 comprises a mounting portion 20 for mounting the pulley assembly 10 to the shaft 12. The mounting portion 20 includes a central bore 22 for receiving the shaft 12 therein and a mounting mechanism 24 for fixing the shaft 12 in place within the bore 22, thereby connecting the pulley assembly 10 and shaft 12 together. The mounting mechanism 24 may, e.g. be a bolt that joins the shaft to a front surface of the pulley 16 along the central axis, a clamp that surrounding the shaft or some threaded arrangement.

The high-speed pulley 16 further comprises a running portion 26 and a storage portion 28. The running and storage portions 26, 28 are annular and are aligned with one another so as to be axially aligned on the central axis A and to be adjacent one another along the central axis A. The running and storage portions 26, 28 each surround the mounting portion 20 and are connected to the mounting portion 20 by a connecting flange 30. The connecting flange 30 connects to the interior surfaces 32, 34 of each of the running and storage portions 26, 28 in a region closest to the edges of the portions 26, 28 that abut one another. The connecting flange 30 also connects the portions 26, 28 together.

The running portion 26 has a high-speed running surface 36 for engaging with the high-speed drive belt 14 when the pulley assembly 10 is in the high-speed configuration. The high-speed running surface 36 is the exterior surface of the annular running portion 26. As can be best seen in FIG. 3, the high-speed running surface 36 has protruding teeth 38 that cooperate with grooves 40 in the drive belt 14 for improved transmission of power.

The storage portion 28 comprises a storage surface 42 at its exterior and a plurality of teeth 44 that extend radially away from the storage surface 42 and radially away from the central axis A of the pulley assembly 10. The teeth 44 are projections having a front surface 46 and a rear surface 48 that are substantially perpendicular to the storage surface 42 and parallel with one another. The front surfaces 46 of the teeth 44 face towards the running portion 26.

The plurality of teeth 44 are divided into a first set of teeth 50 and a second set of teeth 52. The front surface 46 of each tooth in the first set of teeth 50 is aligned with an edge of the storage surface 42 closest to the running portion 26. The rear surface 48 of each tooth in the second set of teeth 52 is aligned with the other edge of the storage surface 42. Each of the first and second sets of teeth 50, 52 includes six teeth spaced evenly around a circumference of the storage portion 28. There are an equal number of teeth in the first set of teeth 50 as there are teeth in the second set of teeth 52, in this case six teeth in each set, although in other embodiments different numbers of teeth may be present in each set, and/or the number of teeth in a set may be one or more. The equal spacing of the teeth around their respective circumference results in spaces 53, 54 being defined between adjacent teeth in each respective set. The spaces between the teeth of the first set 50 are labelled 53, while the spaces between the teeth of the second set 52 are labelled 54.

The sets of teeth 50, 52 are angularly offset relative to one another. As best seen in the front views of the pulley assembly in FIGS. 2 and 5, the teeth of the first set of teeth 50 are arranged to align with the centre of the spaces 54 between the teeth of the second set of teeth 52, and vice versa. In other words, when considered together, the teeth of the first and second sets 50, 52 are equally spaced around a circumference relative to one another, in addition to the teeth of each set being equally spaced around the circumference. This arrangement of teeth provides an operational advantage by making transition between configurations easier, as will be described in more detail below.

The teeth of the first and second sets of teeth have different heights, the teeth of the first set of teeth being approximately half the height of the second set of teeth.

In use, the purpose of the teeth is to engage with teeth of a third set of teeth located on the low-speed pulley 18 in order to connect the pulleys 16, 18 together so that the pulley assembly 10 rotates as one. Each set of teeth 50, 52 therefore includes an engagement mechanism for engaging with the low-speed pulley 18. In the embodiment shown in FIGS. 1 to 6, the engagement mechanism of each of the teeth of the first set of teeth 50 comprises a bolt hole 56 for receiving a bolt therethrough. The engagement mechanism of each of the teeth of the second set of teeth 52 comprises a bolt hole 58 for receiving a bolt therethrough and a ridge 60 configured to cooperate with a corresponding ridge in the low-speed pulley 18. The bolt holes 56, 58 extend from the front face 46, 48 to the rear face of each tooth. The ridge 60 is positioned on the rear face 48 of each tooth. The bolt holes 56 and the bolt holes 58 can be considered to lie on a circumference passing through all bolt holes 56, 58 in the same set of teeth. As the teeth of the sets are at different heights, the bolt holes 56, 58 lie on different circumferences.

Still referring to FIGS. 1 to 6, the low-speed pulley 18 is an annulus having an interior diameter that is greater than the exterior diameter of the high-speed pulley 18 so that the low-speed pulley 18 surrounds the high-speed pulley 16. The exterior surface of the low-speed pulley 18 is a low-speed running surface 62 for engaging with the low-speed drive belt 15 when the pulley assembly 10 is in the low-speed configuration. The low-speed running surface 6 has protruding teeth 64 that cooperate with grooves 66 in the drive belt 15 for improved transmission of power and to avoid slippage.

As discussed above, a plurality of teeth forming a third set of teeth 68 extend from the interior surface 70, or mounting surface, of the low-speed pulley 18 radially towards the central axis A. The teeth 68 have a front surface facing the high-speed running surface 36 and a rear surface facing away from the high-speed running surface 36. The teeth of the third set of teeth 68 are evenly spaced around an interior circumference of the low-speed pulley 18 and the rear surface of each tooth is arranged at an edge of the interior surface 70. The edge of each tooth is aligned with the edge of the interior surface 70, so that the teeth do not extend beyond the width of the running surface of the low-speed pulley 18. The number of teeth in the third set 68 matches the number of teeth in the first and second sets of teeth 50, 52. In the embodiments of FIGS. 1 to 6, each of the first, second, and third sets of teeth 50, 52, 68 have six teeth.

The teeth of the third set of teeth 68, which have a substantially similar height as the second set of teeth 52, each incorporate two bolt holes 72, 74. One 72 of the two bolt holes in each tooth lies on the same circumference as the bolt holes 58 in the second set of teeth 52, and the other bolt hole 74 lies on the same circumference as the bolt holes 56 in the first set of teeth 50. As a result, when the third set of teeth 68 is aligned with either the first or second set of teeth 50, 52, one of the two bolt holes 72, 74 in each tooth of the third set of teeth aligns with the bolt hole 56, 58 in a tooth of the first or second sets of teeth 50, 52. A bolt (not shown) is passed through both aligned bolt holes to fix the aligned teeth together. The teeth of the third set 68 also incorporate a ridge 76 at their front face for cooperating with the ridge 60 in each of the teeth in the second set of teeth 52. The ridges increase friction between the teeth, improving the engagement and holding the low-speed pulley in the storage position in preparation for passing the bolt through the aligned bolt holes.

It will be appreciated that the third set of teeth may, in some embodiments, have one bolt hole only, and that that bolt hole aligns with bolt holes in the teeth of both the first and second sets of teeth.

In use, the third set of teeth 68 is configured to engage with the first and second sets of teeth 50, 52 when the pulley assembly 10 is in its low- and high-speed configurations respectively.

Concentrating initially on the high-speed configuration of the pulley assembly 10 as shown in FIGS. 1 to 3, drive belt 14 is engaged with the running surface 36 of the high-speed pulley 16. The low-speed pulley 18 is positioned to surround the storage portion 28 of the high-speed pulley 16, and so can be said to be in a storage position. In the storage position, the low-speed pulley 18 does not overlap the running surface 36 of the high-speed pulley 16. The running surface 36 of the high-speed pulley 16 is exposed to permit the drive belt 14 to fully engage with the high-speed running surface 36 without interference.

When the low-speed pulley 18 is in the storage position, the second and third sets of teeth 52, 68 are engaged. Particularly, the front face of each tooth of the third set of teeth 68 is engaged with the rear face of one tooth of the second set of teeth 52. The bolt holes 58 of the second set of teeth 52 are aligned with the bolt holes 72 of the third set of teeth 68 that lie on the same circumference. The cooperating ridges 60, 76 of the teeth of each set are aligned, and the third and second sets of teeth 68, 52 are held in place by a bolt passing through the aligned bolt holes 58, 72. The bolts are not shown in these figures for clarity.

A different arrangement of teeth or the sets of teeth on the storage surface 42 of the high speed pulley and the interior surface 70 of the low speed pulley may lead to different configurations of the pulley assembly having the same effect as in the described embodiments. The specific arrangement of the present embodiment is provided to maintain a compact profile. However, other arrangements may be configured to further improve strength of the connection, to reduce the overall weight of the pulley assembly, or to improve the ease of transition between configurations, and so may have different arrangements of teeth or sets of teeth.

When a user wishes to operate the feed roller at a low-speed, the pulley assembly 10 is transitioned from its high-speed configuration to its low-speed configuration. As already noted, FIGS. 4 to 6 illustrate the pulley assembly 10 when it is configured in its low-speed configuration. The low-speed configuration will be discussed first, followed by how the reconfiguration of the pulley assembly 10 is achieved.

In the low-speed configuration, the low-speed drive belt 15 is engaged with the low-speed pulley 18, and the rotation of the low-speed pulley 18 by the drive belt 15 is communicated to the high-speed pulley 16 which in turn rotates the shaft 12. In the low-speed configuration, the low-speed pulley 18 is positioned in an active position, in which the running surfaces 36, 62 of the low- and high-speed pulleys 16, 18 are aligned, i.e. the running surfaces 36, 62 have the same axial position relative to the shaft 12 and central axis A. Because, the running surfaces 36, 62 have the same width, the edges of each running surface 36, 62 are in the same plane.

To create the connection between the low-speed pulley 18 and the high-speed pulley 16 to enable the pulley assembly 10 to function correctly in the low-speed configuration and to maintain the low-speed pulley 18 in the active position, the first set of teeth 50 on the high-speed pulley 16 and the third set of teeth 68 on the low-speed pulley 18 are engaged. Specifically, the rear face of the teeth of the third set of teeth 68 and the front face of the teeth of the first set of teeth 50 are engaged.

The relevant bolt hole 74 of the third set of teeth 68 is aligned with the bolt hole 56 of the first set of teeth 50 and the pulleys 16, 18 are fixed together by passing a bolt through each pair of holes to fix the pulleys 16, 18 together. The bolts are not shown in these figures for clarity.

To transition, or reconfigure, the pulley assembly 10 from the high-speed configuration to the low-speed configuration, the user removes the high-speed drive belt 14 from the high-speed running surface 36. The bolts extending through the aligned bolt holes 58, 72 of the second and third sets of teeth 52, 68 are removed so that the pulleys 16, 18 are not fixed together.

The low-speed pulley 18 is then rotated about the central axis A and relative to the high-speed pulley 16 until the second and third sets of teeth 52, 68 are not overlapping and so that each tooth of the third set of teeth 68 is aligned with one of the spaces 54 between the teeth of the second set of teeth 52. The low-speed pulley 18 is moved axially along the central axis A so that the third set of teeth 68 pass through the spaces 54 between the second set of teeth 52.

As the first set of teeth 50 are aligned with the spaces 54 between the second set of teeth 52, the axial movement of the low-speed pulley 18 is limited by the first set of teeth 50.

The low-speed pulley 18 is rotated again so that the first and third sets of teeth 50, 68 are not overlapping and so that the low-speed pulley 18 can continue its axial movement by the teeth of the third set of teeth 68 passing through the spaces 53 between the teeth of the first set of teeth 50.

Once the third set of teeth 68 have passed through the spaces 53 between the teeth of the first set of teeth 50, the low-speed pulley 18 is rotated until the first and third sets of teeth 50, 68 are aligned, particularly until bolt holes 56, 74 of the first and third sets of teeth 50, 68 are aligned. Bolts are passed through the bolt holes 56, 74 and the low-speed pulley 18 is fixed in its active position and the pulley assembly 10 is in its low-speed configuration. The low-speed drive belt 15 is engaged with the running surface 62 of the low-speed pulley 18 so that the pulley assembly 10 can be operated in its low-speed configuration.

Figure 7:
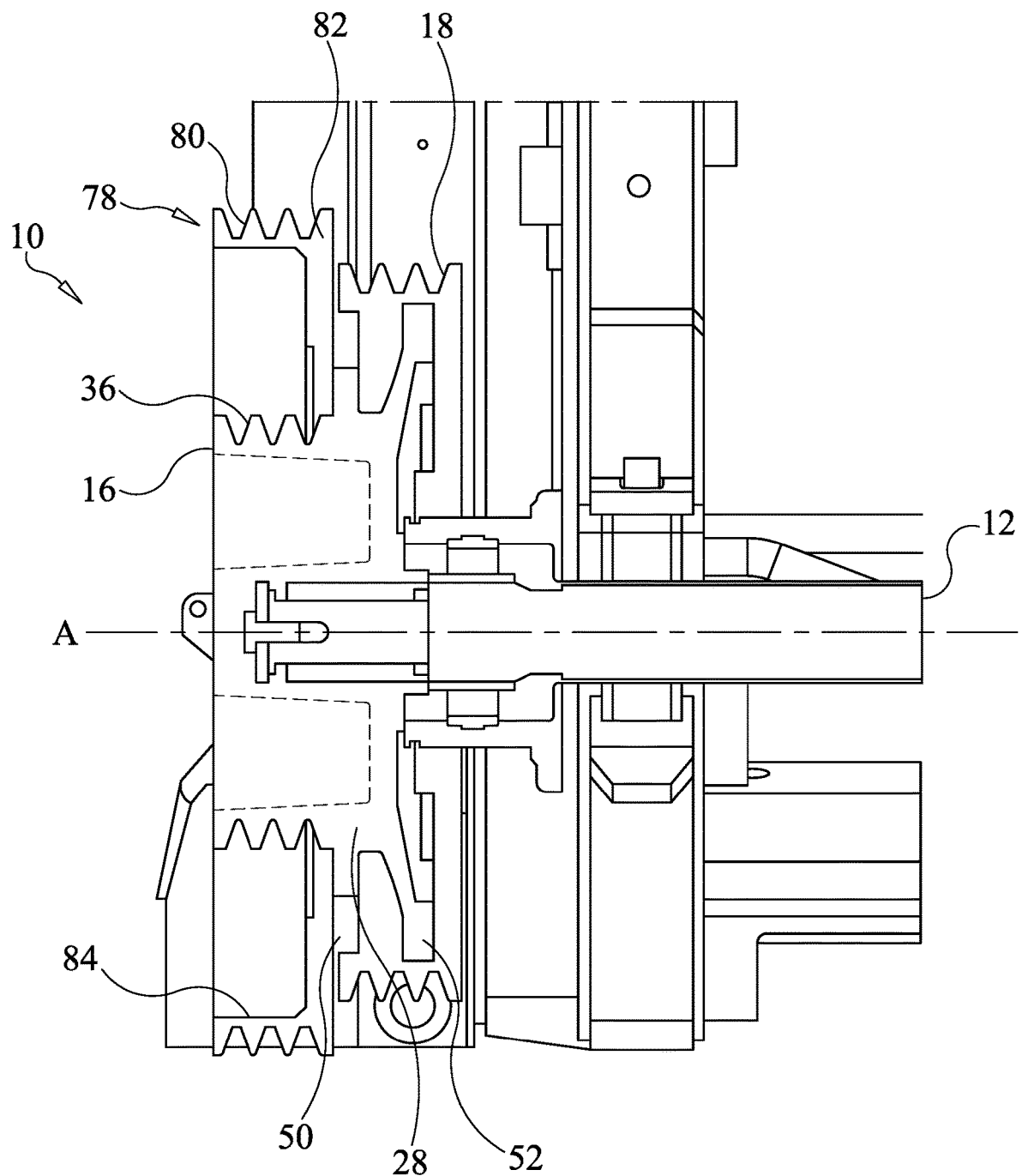
FIG. 7 shows a cross-sectional view of the pulley assembly of FIG. 1 in a further configuration.

FIG. 7 illustrates the pulley assembly 10 in a further configuration. In the configuration of FIG. 7, the low-speed pulley 18 is positioned over the storage portion 28 of the high-speed pulley 16 and so is in its storage position. However, in contrast to the high-speed configuration, the high-speed drive belt 14 is not in use and is not engaged with the high-speed running surface 36. Instead, a further pulley 78 is positioned in an active position. The further pulley 78 has a running surface 80 and a set of teeth 82 that extend radially toward its central axis A. The diameter of the further pulley 78 differs from the diameters of the high- and low-speed pulleys 16, 18, and so achieves a different speed of rotation. In the embodiment of FIG. 7, the further pulley 78 will rotate at a lower speed than the low-speed pulley 18, although it will be appreciated that the further pulley 78 could have any diameter greater than that of the high-speed pulley 16. It will be appreciated that because the further pulley 78 has a different diameter to either the high- or the low-speed pulley 16, 18, a different drive belt may also be required.

The further pulley 78 is an annulus having a running surface 80 and an interior surface 84 and incorporates a fourth set of teeth 82 that extend radially away from the mounting surface 84 towards the central axis A. The teeth of the fourth set of teeth 84 are configured to engage with the first set of teeth 50 to hold the further pulley 78 in the active position so that a different speed can be achieved.

In some embodiments, the low-speed pulley 18 may be removed entirely and replaced with the further pulley 78.

Figure 8:
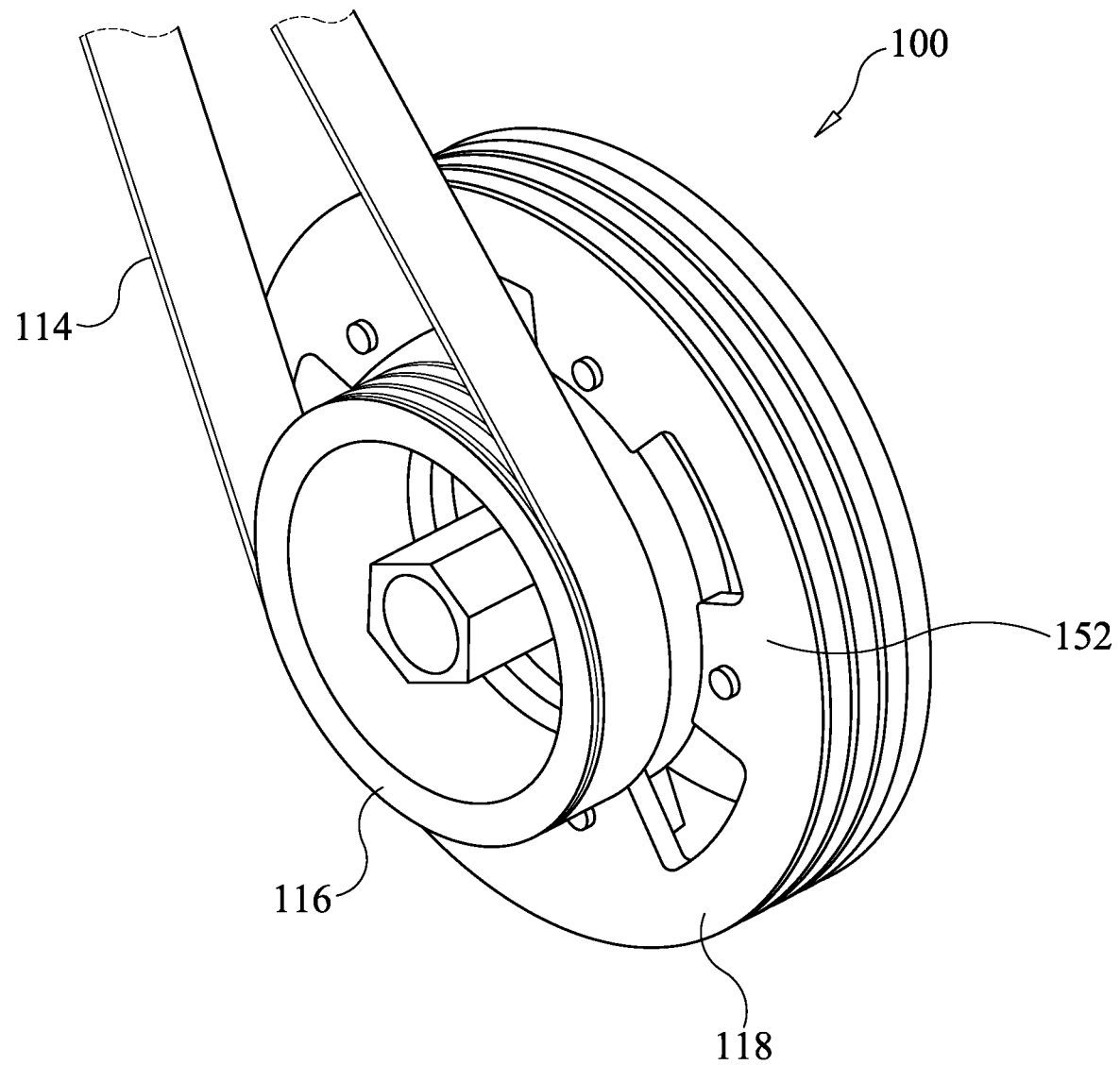
FIG. 8 shows a perspective view of a pulley assembly in a high-speed configuration according to another embodiment of the invention.
Figure 9:
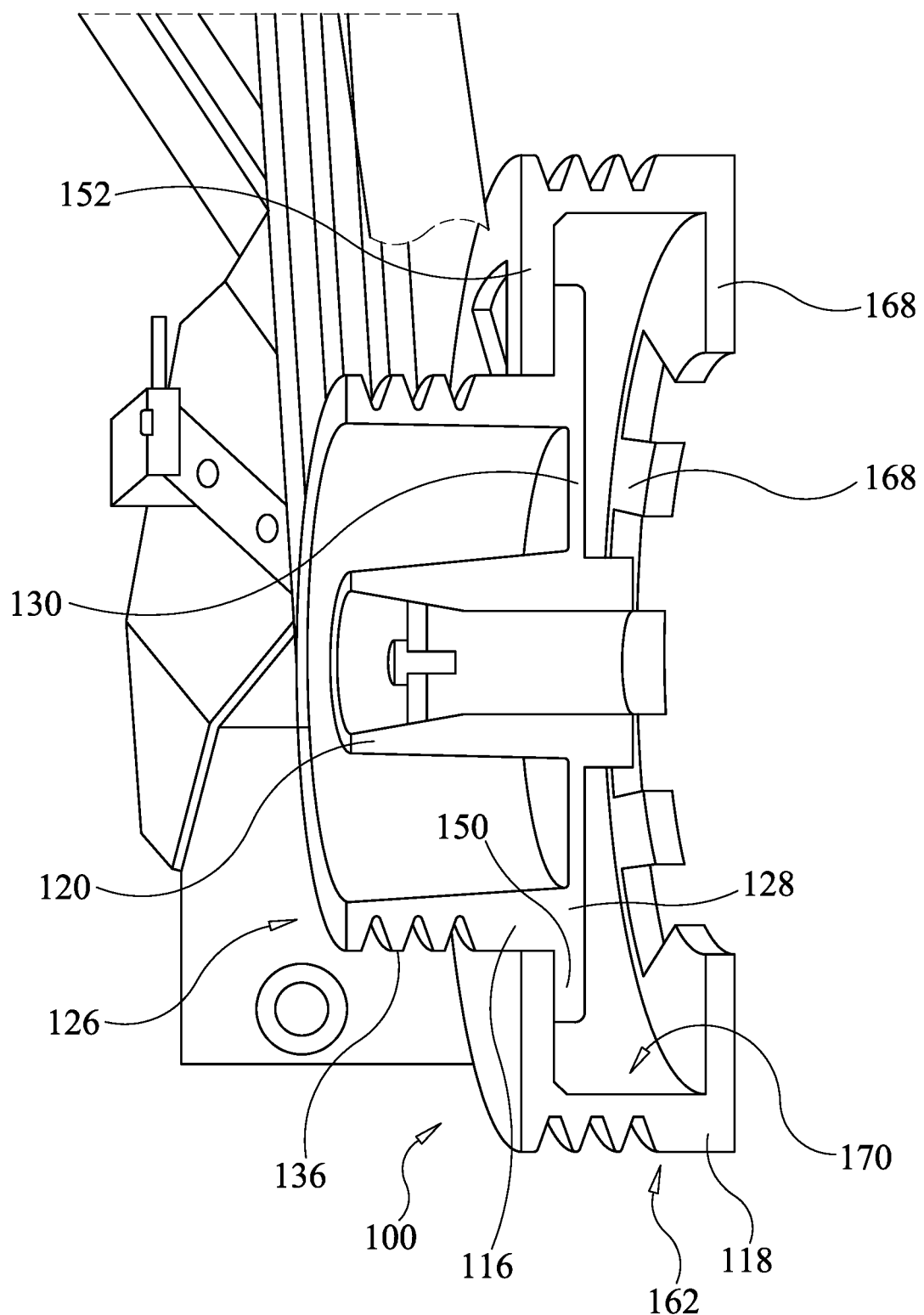
FIG. 9 shows a cross-sectional view of the pulley assembly of FIG. 8 in the high-speed configuration.
Figure 10:
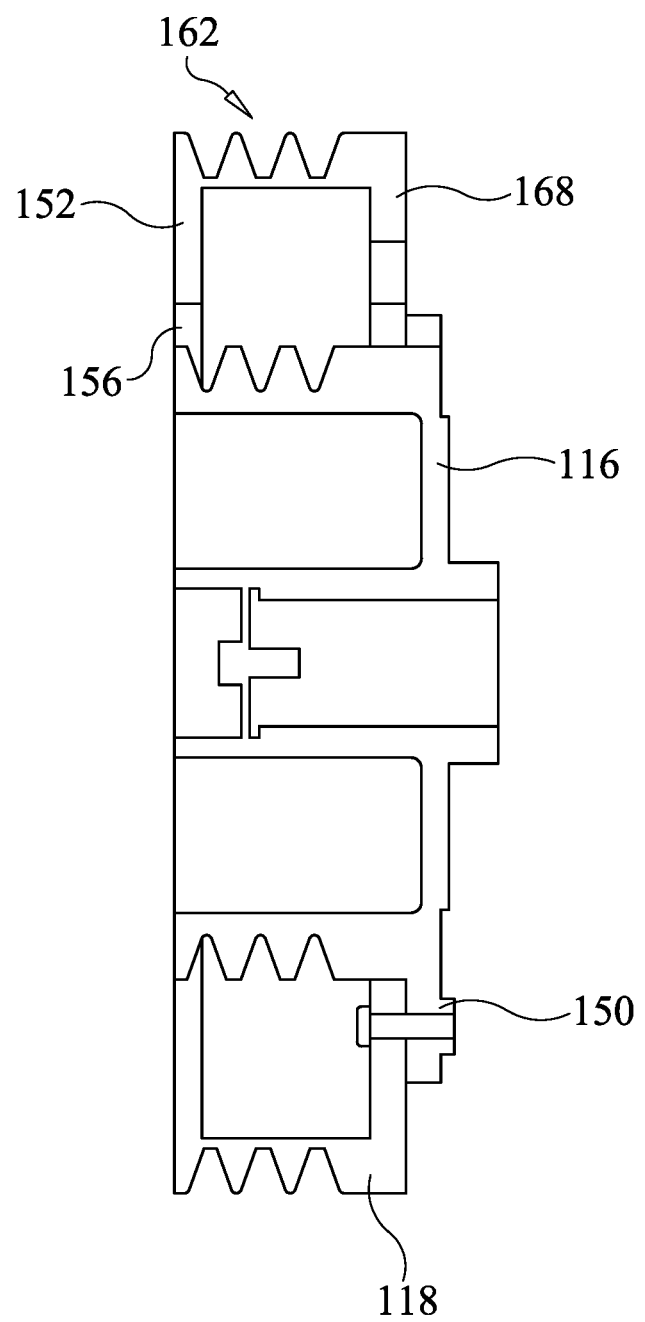
FIG. 10 shows a cross-sectional view of the pulley assembly of FIG. 8 in a low-speed configuration.

An alternative embodiment of the pulley assembly 100 is shown in FIGS. 8 to 10. The pulley assembly 100 of FIGS. 8 to 10 is configurable in a low-speed and a high-speed configuration. FIGS. 8 and 9 are perspective and side views of the pulley assembly 100 in the high-speed configuration, while FIG. 10 is a side view of the pulley assembly 100 in the low-speed configuration. The pulley assembly 100 comprises a high-speed pulley 116 and a low-speed pulley 118 and is shown mounted on the shaft 12.

The pulley assembly 100 of FIGS. 8 to 10 differs from the pulley assembly 10 of FIGS. 1 to 6 by the positioning of the sets of teeth and how they are arranged to achieve the different configurations.

In this embodiment, the high-speed pulley 116 comprises a running portion 126 including a running surface 136 for receiving a drive belt 114, a mounting portion 120, a connecting flange 130, and a storage portion 128 in a similar way to the pulley assembly 10 of the previous embodiment. From FIGS. 8 to 10, it will be noted that the storage portion 128 of the high-speed pulley 116 is not as wide as the previous storage portion 28. The reason for this is that only one set of teeth, the first set of teeth 150 hereinafter, extend from the storage portion 128 of the high-speed pulley 116 in this embodiment, rather than two.

The low-speed pulley 118, which is an annulus having an interior surface 170 and an exterior, running surface 162 for receiving a drive belt (not shown), has two sets of teeth that extend from it towards the central axis A. As in the previous embodiment, the sets of teeth on the pulley with two sets of teeth are called the second and third sets of teeth 152, 168. The teeth of the second and third sets of teeth 152, 168 are positioned against opposing edges of the interior surface 170. In this embodiment, the second and third sets of teeth 152, 168 are aligned. It will be appreciated that the second and third sets may be offset in other embodiments.

A single bolt hole 156 is provided in each tooth. The bolt hole 156 in each tooth of the first set 150 is positioned to align with the bolt holes 156 of the teeth in the second and third sets 152, 168. In an alternative embodiment, each tooth of the first set may include two bolt holes: one hole for aligning with the bolt holes in the teeth of the second set and the other hole for aligning with the bolt holes in the teeth of the third set.

In the high-speed configuration, the high-speed running surface 136 is exposed and is able to receive a drive belt. The low-speed pulley 118 is positioned in its storage position, in which the first set of teeth 150 that extends from the high-speed pulley 116 is engaged with the second set of teeth 152 that extends from the low-speed pulley 118 at the edge of the interior surface 170 closest to the high-speed running surface 136.

In the low-speed configuration, as shown in FIG. 10, the third set of teeth 168 of the low-speed pulley 118 is engaged with the first set of teeth 150 of the high-speed pulley 116 so that the running surfaces 136, 162 of the pulleys 116, 118 are aligned, and so that the low-speed pulley 118 is in its active position. As shown in FIG. 10, the unengaged, second set of teeth 152 rests above or against an edge of the high-speed pulley 116.

To transition from the high- to the low-speed configuration, the engaged first and second sets of teeth 150, 152 are disengaged, the low-speed pulley 118 is moved axially relative to the high-speed pulley 118 so that the third set of teeth 168 is in contact with the rear of the first set of teeth 150. The low-speed pulley 118 is rotated relative to the high-speed pulley 116 so that the teeth in the third set of teeth 168 are aligned with spaces 153 between the teeth of the first set 150. The low-speed pulley 118 is moved axially relative to the high-speed pulley 116 once more so that the third set of teeth 168 move between the teeth of the first set of teeth 150. The low-speed pulley 118 is rotated again so that the third set of teeth 168 and first set of teeth 150 align, and particularly so that their bolt holes 156 align, and the teeth are engaged to hold the low-speed pulley 118 is fixed in its active position, the pulley assembly 100 being in the low-speed configuration.

The embodiments of FIGS. 1 to 10 may be generally described as each having three sets of teeth, wherein a first set of teeth extends from one of the high- and low-speed pulleys, and the second and third sets of teeth extend from the other of the high- and low-speed pulleys. When considering how the arrangements of the pulleys in the high- and low-speed pulleys, therefore, the first and second set of teeth can be considered to always be engaged when the pulley assembly is in the low-speed configuration, and the first and third sets of teeth can be considered to be engaged when the pulley assembly is in the high-speed configuration, regardless of whether the high- or the low-speed pulley includes the two sets of teeth.

Many modifications may be made to the above embodiments without departing from the scope of the claims. For example, one set of teeth, arranged such that it does not have to pass any other set of teeth during reconfiguration of the assembly, could be embodied as a single flange that extends around the entire circumference of the pulley. The flange may incorporate bolt holes through the flange at regular intervals for engaging with teeth of one of the other sets.

It is envisaged that the high-speed pulley will be rotatable at 1100 rpm, the low-speed pulley will be rotatable at 640 rpm. The further pulley may, e.g., be sized to achieve 557 rpm.

It will be appreciated that various changes and modifications can be made to the present invention without departing from the scope of the present application.

The invention claimed is:

1. A pulley assembly for mounting on a rotatable shaft of an agricultural harvester, the pulley assembly operable in a high-speed configuration or a low-speed configuration, the pulley assembly comprising:
   a high-speed pulley having a high-speed running surface for receiving a drive belt when the pulley assembly is in the high-speed configuration, a mount for mounting the high-speed pulley to the rotatable shaft for rotation of the high-speed pulley about a central axis, and a storage surface;
   a low-speed pulley having a low-speed running surface for receiving a drive belt when the pulley assembly is in the low-speed configuration, and a mounting surface for mounting the low-speed pulley to the high-speed pulley;
   three sets of teeth, each set of teeth comprising at least one tooth that extends either from the mounting surface radially towards the central axis or from the storage surface radially away from the central axis, and wherein a first set of the three sets of teeth extends from a different surface than a second set of teeth and a third set of teeth of the three sets of teeth; and
   a removable further pulley with a diameter that is greater than a diameter of the high-speed pulley and smaller than a diameter of the low-speed pulley,
   wherein:
      in the low-speed configuration, the running surfaces of the low-speed pulley and high-speed pulley are axially aligned and the first set of teeth and the second set of teeth are engaged;
      in the high-speed configuration, the running surface of the high-speed pulley is exposed for receiving the drive belt, the low-speed pulley is positioned beside the running surface of the high-speed pulley along the central axis, and the first set of teeth and the third set of teeth are engaged; and
      the pulley assembly being configurable between the high- and low-speed configurations by disengagement of the teeth, movement of the low-speed pulley along the central axis, and engagement of the teeth.

2. The pulley assembly of claim 1, wherein each set of teeth comprises more than one tooth, and wherein the teeth are evenly spaced around a circumference of their respective surface.

3. The pulley assembly of claim 2, wherein the distance between adjacent teeth of the teeth in each of the second or third sets of teeth is wider than the width of each tooth in the first set of teeth, thereby permitting the teeth of the first set of teeth to pass between the teeth in the second or third sets of teeth while the pulley assembly is configured between the high- and low-speed configurations.

4. The pulley assembly of claim 2, wherein each tooth of the second set of teeth is aligned with a space between two teeth of the third set of teeth.

5. The pulley assembly of claim 1, wherein configuration of the pulley assembly between the high- and low-speed configurations is achievable by disengaging the engaged teeth, rotating the low-speed pulley relative to the high-speed pulley and the central axis, moving the low-speed pulley along the central axis relative to the high-speed pulley, and engaging the teeth.

6. The pulley assembly of claim 1, wherein each tooth of the first set of teeth comprises at least one bolt hole for receiving a bolt, and wherein the bolt holes are positioned on the teeth to align with respective bolt holes of the teeth of the second and/or third sets.

7. The pulley assembly of claim 6, wherein the bolt holes are threaded.

8. The pulley assembly of claim 1, wherein the teeth of the first set of teeth and of at least one of the second and third sets of teeth comprise cooperating ridges, the cooperating ridges being positioned on faces of the teeth, such that when the sets of teeth are engaged, the cooperating ridges of the engaged teeth are engaged too.

9. The pulley assembly of claim 1, wherein the first set of teeth extends from the low-speed pulley, and wherein the second and third sets of teeth extend from the high-speed pulley.

10. The pulley assembly of claim 9, wherein the further pulley includes:
    a further running surface for receiving a drive belt,
    a second mounting surface for mounting the further pulley to the high-speed pulley, and
    a fourth set of teeth comprising at least one tooth that extends from the second mounting surface radially towards the central axis, wherein:
       the fourth set of teeth is configured to engage with the second set of teeth in order to align the running surfaces of the further and high-speed pulleys.

11. The pulley assembly of claim 1, wherein the first set of teeth extends from the high-speed pulley, and wherein the second and third sets of teeth extend from the low-speed pulley.

12. An agricultural harvester comprising the pulley assembly of claim 1.

13. The agricultural harvester of claim 12, wherein the agricultural harvester is a combine harvester comprising a feeding section, a threshing section, and a feed roller for conveying harvester crop from the feeding section towards the threshing section, the pulley assembly being mounted to a rotatable shaft of the feed roller.

14. A method of configuring the pulley assembly according to claim 1 from the high-speed configuration to the low-speed configuration or from the low-speed configuration to the high-speed configuration, the method comprising:
   disengaging the first set of teeth from one of the second or third sets of teeth;
   rotating the low-speed pulley relative to the high-speed pulley;
   moving the low-speed pulley along the central axis relative to the high-speed pulley; and
   engaging the first set of teeth to the other one of the second or third sets of teeth.

15. The method of claim 14, wherein the teeth are evenly spaced around a circumference of their respective surface so that spaces are formed between adjacent teeth and wherein the distance between adjacent teeth of the teeth in each of the second or third sets of teeth is wider than the width of each tooth in the first set of teeth, and wherein rotating the low-speed pulley relative to the high-speed pulley comprises rotating the low-speed pulley to align each tooth of the first set of teeth with a space, and wherein moving the low-speed pulley comprises moving the teeth of the first set of teeth through the spaces.

16. The method of claim 14, wherein rotating the low-speed pulley relative to the high-speed pulley is performed at least twice.

17. The method of claim 16, wherein rotating the low-speed pulley relative to the high-speed pulley is performed three times and wherein moving the low-speed pulley along the central axis relative to the high-speed pulley is performed twice.

* * * * *